March 17, 1970  J. H. ANDERSON  3,500,660

FLEXIBLE COUPLINGS AND HUB MOUNTINGS

Filed Nov. 26, 1968  3 Sheets-Sheet 1

INVENTOR
JAMES H. ANDERSON

BY *Kenyon, Palmer & Estabrook*

ATTORNEYS

March 17, 1970 J. H. ANDERSON 3,500,660
FLEXIBLE COUPLINGS AND HUB MOUNTINGS
Filed Nov. 26, 1968 3 Sheets-Sheet 2

INVENTOR
JAMES H. ANDERSON

BY *Kenyon, Palmer & Estabrook*

ATTORNEYS

March 17, 1970  J. H. ANDERSON  3,500,660
FLEXIBLE COUPLINGS AND HUB MOUNTINGS
Filed Nov. 26, 1968  3 Sheets-Sheet 3
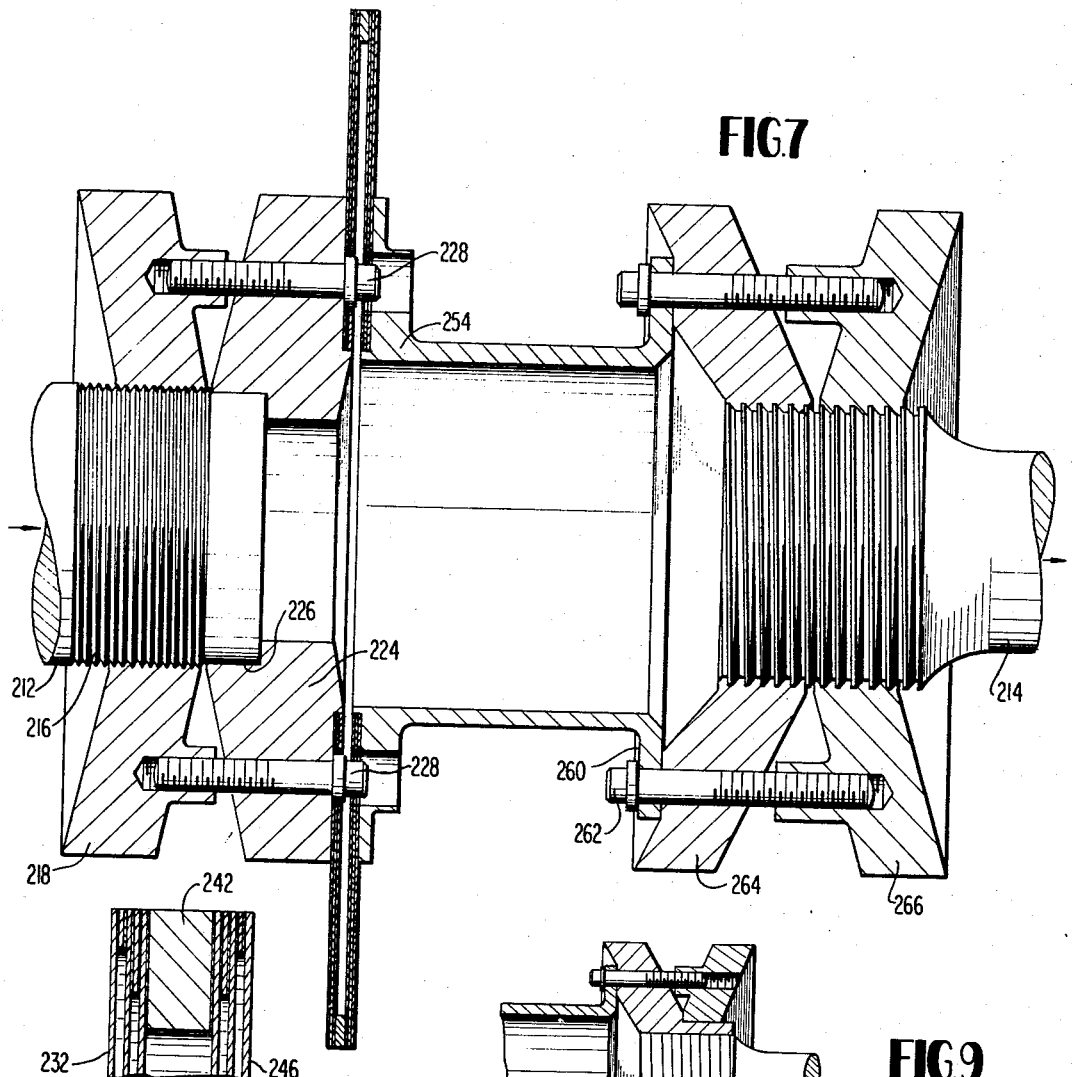
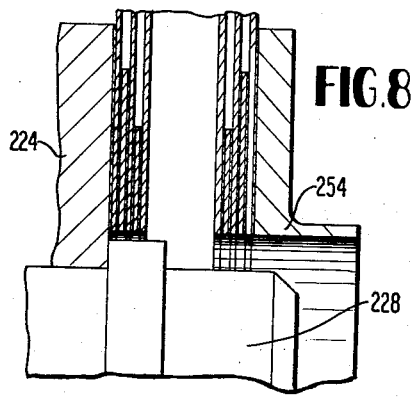
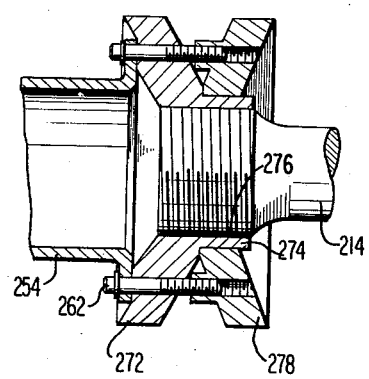
INVENTOR
JAMES H. ANDERSON
BY *Kenyon Palmer & Estabrook*
ATTORNEYS

United States Patent Office 3,500,660
Patented Mar. 17, 1970

3,500,660
FLEXIBLE COUPLINGS AND HUB MOUNTINGS
James H. Anderson, 1615 Hillock Lane,
York, Pa. 17403
Filed Nov. 26, 1968, Ser. No. 779,125
Int. Cl. F16b 7/02, 7/18; F16d 3/79
U.S. Cl. 64—13                                      12 Claims

ABSTRACT OF THE DISCLOSURE

A flexible coupling or connection between substantially aligned rotating shafts of high torque transmitting capabilities wherein the coupling is of the flexible disc type and is in frictional engagement with at least one of the shafts. The coupling permits a certain degree of axial as well as angular displacement between the shafts while at the same time providing for relatively quick and simple mounting and de-mounting of the coupling.

CROSS REFERENCE TO RELATED APPLICATION

The present invention is an improvement over that disclosed and described in my copending application for Quick Disconnect Flexible Couplings and Hub Mountings, Ser. No. 614,707, filed Feb. 8, 1967, now Patent No. 3,427,826.

BACKGROUND OF THE INVENTION

The present invention relates broadly to couplings or connections and more specifically to flexible couplings or connections between rotating shafts embodying a yielding element that may be of the disc type.

In flexible couplings of the prior art type, the use of struts for the coupling medium has been employed as well as the use of flexible discs connected to and carried by hub members. While couplings of this type were usually adequate for the described purpose, they did not provide for the degree of flexibility commensurate with torque transmitting capabilities that were often desired under various conditions. The manner in which the hub members were mounted on the ends of the shafts and the flexible discs secured to the hub members and the ring member did not, in many instances, produce the desired results. The present invention is directed to improving the manner of mounting the hub members on the shaft ends and also as to the mounting of the flexible discs upon the hub members and outer ring to produce a laminated structure that tends to dampen out various and sundry vibrations that were found to be prevalent in certain prior devices. The use of a plurality of flexible discs in the manner as disclosed herein, and the bonding together of said discs by a bond of appreciable thickness and of a much lower modulus of elasticity than the metallic discs tends to produce a flexible coupling or connection that avoids certain of the defects of the prior art.

SUMMARY OF THE INVENTION

The present invention is directed to a flexible coupling device for a pair of substantially aligned rotating shafts. The coupling device embodies hub members or elements for said shafts with at least one of said members or elements having frictional engagement with an end portion of one of said shafts. The flexible coupling embodies an annular flange or ring member which has bonded to its outer faces thereof a laminated structure comprising a plurality of flexible discs, which may be three or more, that in turn are bonded to one another by any suitable adhesive of an appreciable thickness which has a much lower modulus of elasticity than does the material of the discs. The hub member or element is preferably formed so as to have a cone shape or configuration which allows said member to function like a dished or Belleville spring, thereby materially enhancing its frictional engagement or fit upon the end of said shaft. In addition, the cone shape or configuration permits the use of a hub member much lighter in weight and considerably thinner for a given bolt load than those of prior art devices, while at the same time producing a higher clamping force on the shaft for a given bolt load. Furthermore, the laminated disc structure may have the discs bonded to one another and then in turn the outermost discs of the laminated structure are bonded to the hub structures while the inner discs of the laminated structure are bonded to the ring member and these bonds constitute the connecting means between the laminated structure and the ring and hub structures. It is through the use of stronger bonding joints that such an arrangement is possible as the entire load can be carried in single shear instead of double shear loading as required in prior devices. The bonding of the discs to the hub structures permits the discs to be brought down further along the face of the hub member, thereby providing for a large bonding area which permits the elimination of lug rings that were employed in the prior art to transmit shear load from one side of the ring member to the other side. A still further embodiment of the present invention resides in the unique and novel manner of securing the sleeve type hub member to the end of the output or driven shaft. The arrangement is such that slight axial adjustments of position can be readily made without the necessity of moving either machine that is connected to or carried by the rotating shafts and in addition a much superior clamping force can be obtained with respect to said driven shaft.

BRIEF DESCRIPTION OF THE DRAWINGS

FIGURE 7 is an elevational view, partly in section, showing a pair of shafts coupled together and embodying a modification of the present invention;

FIGURE 8 is a fragmentary view on an enlarged scale of a portion of the coupling shown in FIGURE 7; and FIGURE 9 is a fragmentary view of a further modified form of connecting the driven shaft to the coupling shown in FIGURE 7.

DESCRIPTION OF THE PREFERRED EMBODIMENTS

Figure 1:
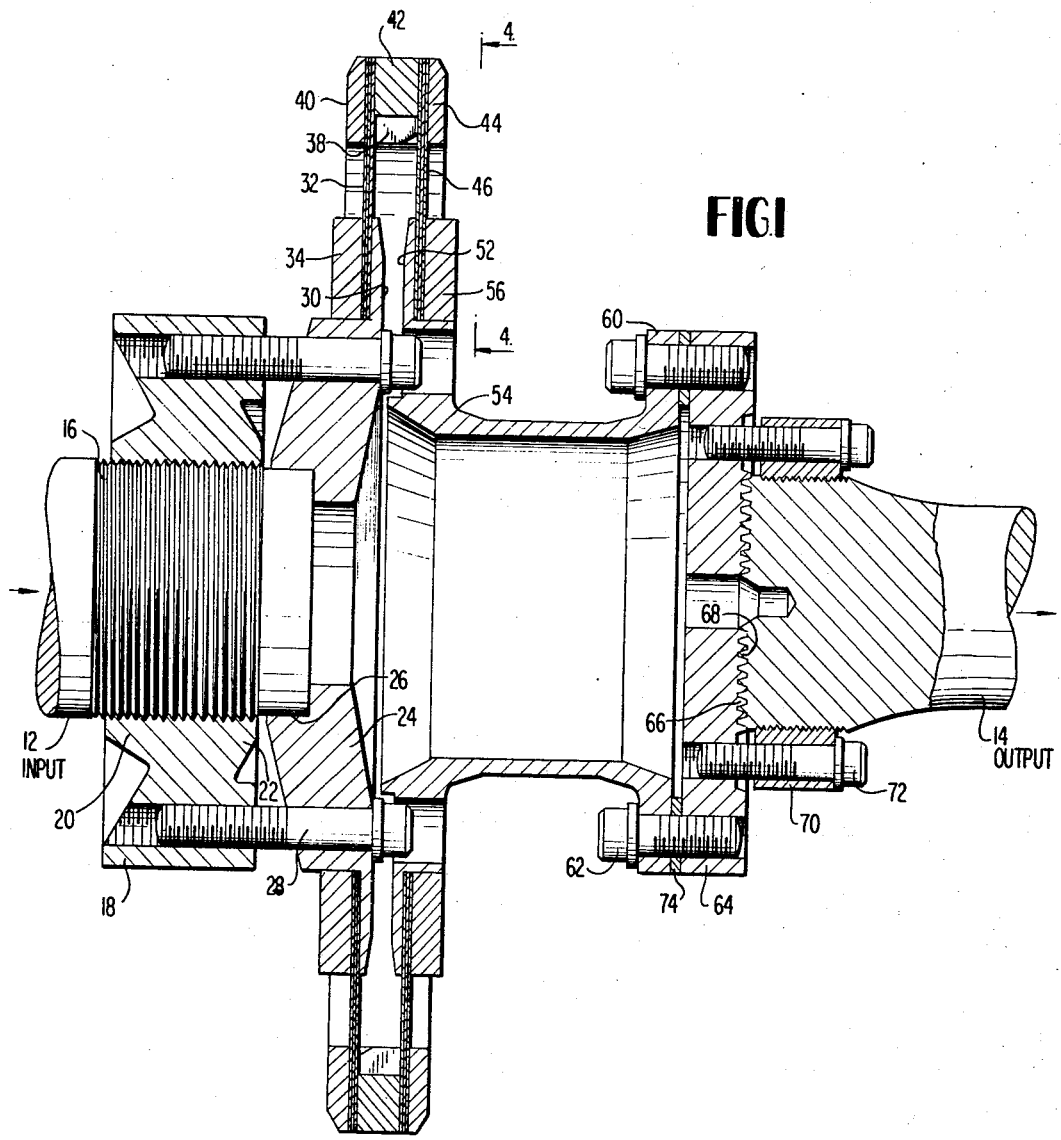
FIGURE 1 is an elevational view, partly in section, showing a pair of shafts coupled together and embodying features of the present invention.

Referring to FIGURE 1, there is shown a shaft 12 which, for purpose of illustration, may be regarded as the input shaft that is coupled to a shaft 14, which may be regarded as the output shaft, by a coupling unit of the present invention for the transmission of torque from one shaft to the other. The shaft 12 is formed with a threaded section 16 adjacent an end portion for the reception of a nut 18 which is formed with annular indentations on opposite faces thereof to produce a nut having a cone shape or configuration. The indentations are so formed as to define extension lips 20 and 22 at the threaded bore of the nut. The end of the shaft 12 has mounted thereon a hub member 24 which is bored and then counter-bored to define a socket or cup-like portion 26 to provide for a frictional fit between the hub member and the end of said shaft. The hub member is formed with a cone shape or configuration which enables said hub member to act or function like a dished or Belleville spring member when the hub member is connected to the nut 18, and said cone shape or configuration tends to permit the hub member to be thinner for a given bolt load and lighter in weight than has been the case with hub members of prior art devices. The hub 24 is formed with a plurality of circumferentially spaced holes adjacent its outer periphery that are designed to receive headed bolts 28 which in turn are threaded into suitable bores formed in the nut 18. Thus, as the bolts 28 are tightened down in the nut 18, the cone shape or configuration of the hub member 24 permits a higher clamping force to be produced on the end of the shaft 12 for a given bolt load, and at the same time, the threads in the extension lips 20 of the nut 18 are placed in tension with respect to the threaded portion 16 of the shaft 12 while the threads in the area of the extension 22 are placed in compression and by this arrangement there is a better distribution of the thread stresses on the shaft 12. Thus, the counter-bored or socket portion 26 of the cone shaped hub member 24 is placed in frictional engagement with the end portion of the shaft 12 so that torque is frictionally transferred from the shaft 12 to the hub member 24. The clamping forces of the bolts 28 with respect to the nut 18 causes the hub member 24 and the counter-bored portion 26 to tilt or incline radially inwardly towards the surface of the shaft 12 to provide for a high clamping force of the hub member upon the end portion of the shaft 12. Thus, a compression or clamping force is produced or developed in the hub member for frictionally securing the hub member upon the end of the shaft 12, and this compression or clamping force is obtainable due to the cone shape of the hub member 24 and the configuration of the nut 18.

Figure 6:
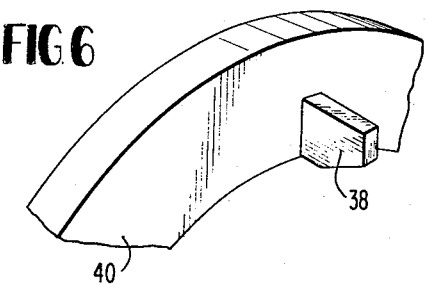
FIGURE 6 is a perspective view of a fragmentary portion of a clamp ring shown in FIGURE 3.
Figure 4:
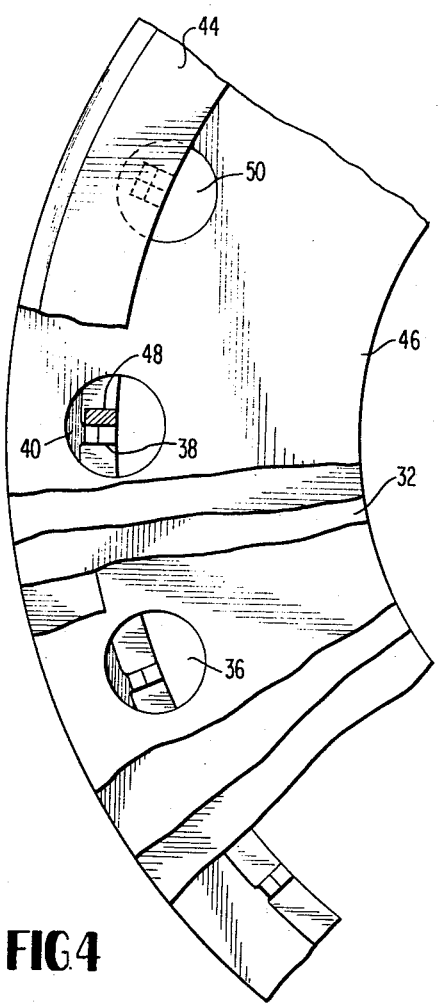
FIGURE 4 is a vertical sectional view of a fragmentary portion of the coupling, the view being taken on the line 4—4 of FIGURE 1.
Figure 3:
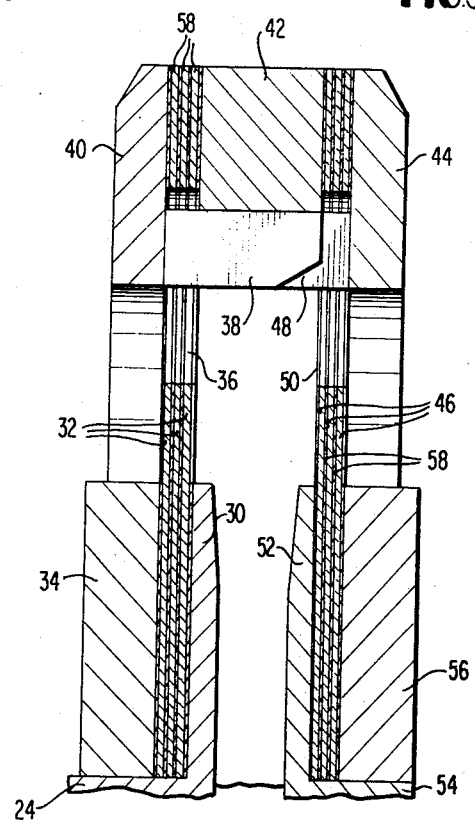
FIGURE 3 is a fragmentary view similar to a portion of FIGURE 1 but to a larger scale.
Figure 5:
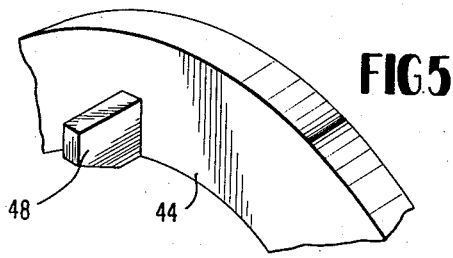
FIGURE 5 is a perspective view of a fragmentary portion of a clamp ring shown in FIGURE 3.

The hub member 24 is formed with a radially extending annular flange 30 which, together with the peripheral surface of the hub member 24, provides a suitable support for the mounting of a laminated coupling structure comprising a plurality of flexible discs 32. The inner portion of the coupling discs 32 are retained in engagement with the annular flange 30 and the hub 24 by means of a clamping ring 34 which is of a radial height commensurate with that of the annular flange 30. The several coupling discs 32 are each formed adjacent their outer peripheral edge, with a plurality of circumferentially spaced apertures or holes 36 which are adapted to receive lugs 38 which are formed in spaced relation on the inner surface of a clamping ring 40; see FIGURES 3 and 6. The clamping ring 40 cooperates with an annular centering ring 42 in supporting the outermost portions of the flexible coupling discs 32, while the centering ring 42 also cooperates with a second clamping ring 44 for supporting the outer annular portion of a second laminated coupling structure comprising a set of flexible coupling discs 46; FIGURES 1 and 3. The clamping ring 44, FIGURE 5, is provided on its inner surface with a plurality of spaced lugs 48 which are arranged to extend through the apertures or holes 50 formed in the flexible coupling discs 46 so that said lugs 48 cooperate with the lugs 38 provided on the clamping ring 40, FIGURE 3. The flexible coupling discs 46 are secured at their inner periphery to a radially extending annular flange 52 that is formed on a second hub or sleeve member 54. The annular flange 52 has associated therewith a clamping ring 56 for retaining the innermost portion of the flexible discs 46 in the same manner that the clamping ring 34 cooperates with the annular flange 30 in retaining the innermost portions of the flexible discs 32.

As more clearly shown in FIGURE 3, the laminated coupling structures are shown, by way of illustration, as consisting of three separate steel discs bonded together by any suitable well known adhesive 58 which covers substantially the entire area of each of said disc members 32 and 46. The cement or adhesive that is utilized for bonding the several discs to one another is of an appreciable thickness and said adhesive or cement has a much lower modulus of elasticity than the steel in the discs 32 and 46. As an illustration of the foregoing, the three discs 32 or 46, as shown in FIGURE 3, could each be .012 inch thick and bonded together over substantially their entire area with an adhesive bonding film of .006 inch thick. Thus, when the hub members 24 and 54 of the coupling are deflected axially with respect to the outer centering ring 42, the coupling discs 32 and 46 must deflect. The adhesive or bonding film 58 positioned between the discs members 32 and 46 has a modulus of elasticity that is very small compared to that of the steel discs 32 and 46 of the coupling structure, and this permits a relatively high shear deflection in the bonding film or adhesive so that the steel discs can deflect nearly as individual discs and thereby keeping the low spring force versus a deflection rate of thin disc members, but at the same time obtaining sufficient strength to transmit the coupling torque by having the flexible coupling made up of a plurality of steel disc members. It also should be borne in mind that the laminated structure that is produced by the bonding of the flexible discs tends to dampen out any vibrations that might otherwise occur if the flexible couplings were formed simply of a plurality of separated steel disc elements. The laminated coupling structures 32 and 46 are both secured to the centering ring 42 by any suitable, well-known adhesive and in a like manner are also secured to the clamping rings 40 and 44. The innermost portions of the steel discs of the flexible coupling members 32 and 46 are also secured to the annular flanges 30 and 52 of the hub members 24 and 54 as well as to the clamping rings 34 and 56 by any suitable, well-known adhesive. Thus, the flexible discs 32 and 46 are formed as a laminated or sandwich type of structure which is secured to or bonded to the hub members 24 and 54 as well as the centering ring 42 by any well-known adhesive.

The hub or sleeve member 54 is of an elongated configuration that extends axially in a direction of the output shaft 14 and which terminates in an external annular flange 60. The flange 60 is provided with a plurality of circumferentially spaced apertures that are adapted to receive headed bolts 62 which are threaded into suitable apertures provided in a plate member 64. The plate member 64 has formed on one end face thereof a spiral thread 66 which engages a similar thread 68 provided on the end of the output shaft 14. The plate 64 is further secured to the end of the shaft 14 by means of a collar 70 that is threaded upon said shaft and which is provided with a plurality of circumferentially spaced holes for the reception of headed bolts 72. The bolts 72 are threaded into the plate member 64 in much the same manner that the plate 64 is secured to the annular flange 60 formed on the hub or sleeve member 54. The plate member 64 and the annular flange 60 have interposed therebetween a suitable spacer 74 which must have an axial thickness that is slightly in excess of the depth of the threads 66 and 68 formed on the ends of the plate member 64 and shaft 14.

Thus, in operation torque is frictionally transferred from the input shaft 12 to the hub member 24 by the frictional engagement of the hub member 24 with the end of the shaft 12 in the manner as heretofore described. The hub member 24 then transmits torque to the sleeve or hub member 54 by a path that includes the flexible coupling discs 32, the centering ring 42, and the coupling discs 46. The hub or sleeve member 54 then transmits torque to the shaft 14 by way of the annular flange 60, the plate member 64 and through the spiral threads 66 and 68 as well as by means of the collar 70 which is connected to the plate member 64 by the bolts 72.

In the event that it becomes necessary or desirable to remove or replace the coupling unit between the shafts 12 and 14, such removal would be relatively simple if the installation of the machinery or equipment utilizing said coupling is such as to permit axial movement of the two shafts. Where the installation of the machinery or equipment is such that axial movement of the shafts 12 and 14 is not readily available, the coupling unit may be easily removed from said shafts by first removing the bolts 62 from the annular flange 60 and plate member 64 so that the spacer 74 may then be removed from between the flange 60 and the plate member 64. The bolts 72 are then removed from the plate member 64 and inasmuch as the spacer 74 was of a thickness greater than the depth of the threads 66 and 68 the plate member 64 may then be rotatably removed from the end of the shaft 14. The plate 64 is of a thickness that is greater than the depth of the counter-bore 26 formed in the hub member 24 so that subsequent to the removal of the plate 64, the bolts 28 may be removed from the nut 18 and the coupling unit may then be withdrawn from the end of the shaft 12.

Figure 2:
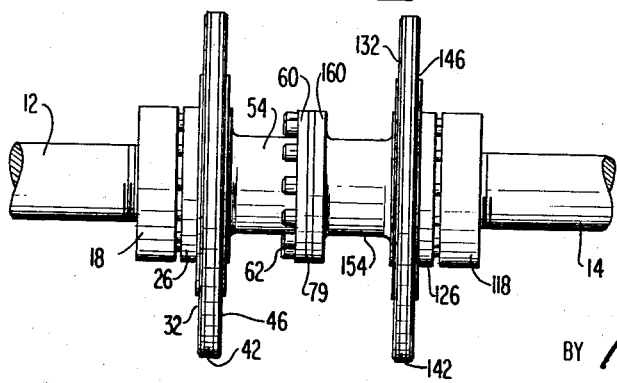
FIGURE 2 is a side elevational view of a pair of shafts coupled together by a plurality of couplings embodying features of the present invention.

Under certain conditions it might be found desirable to dispense with the use of a plate member 64 and the spiral threads 66 and 68 for connecting the shaft 14 to the hub or sleeve member 54 and to substitute for this arrangement a second hub similar to the hub member 24 to connect the hub or sleeve member 54 to an output shaft such as the shaft 14. An illustration of this type of an arrangement is shown in FIGURE 2 wherein the shaft 14 has mounted thereon a coupling unit of the type as shown in FIGURE 1. Thus, in FIGURE 2 the parts shown in the right hand portion of said figure are identical with the parts shown in the left hand portion of said figure and are identified by the same reference numerals only of the next higher series. Thus torque would be transmitted from the input shaft 12 through the hub member 26 and the flexible coupling unit to the hub or sleeve member 54. The annular flange 60 formed on the hub or sleeve member 54 is secured by bolts 62 to a similar flange 160 formed on the hub or sleeve member 154 of the second coupling unit.

Another embodiment of the invention is shown in FIGURES 7 and 8, wherein an input shaft 212 is connected to an output shaft 214 by a coupling unit. The input shaft 212 is provided with a threaded section 216 formed adjacent its end for the reception of a nut or collar 218. The nut 218 is cone shaped so that it tends to act like a Belleville spring and, when forces are applied to said nut, it is tilted inwardly towards the shaft so that substantially the entire bore of the nut moves into the shaft and thereby produces a compression or clamping force on the shaft which is transmitted through the threads 216. The end of the input shaft 212 has mounted thereon a cone shaped hub member 224 which is bored and counter-bored to define a socket or cup-like portion 226 which frictionally engages the end of the shaft 212. The hub member 224 is formed adjacent its outer periphery with a plurality of circumferentially spaced apertures which are adapted to receive headed bolts 228 that extend into threaded bores formed in the nut 218. Thus, as the bolts are tightened in the nut 218, the cone shape of the nut as well as the cone shape of the hub member tend to draw the hub member into frictional engagement with the end of the shaft member by tilting the cup shaped portion 226 of the hub member inwardly onto the end of the shaft 212. At the same time, the nut 218 is being tilted outwardly towards the hub member so as to be compressed against the shaft threads 216, thereby aiding in securing the hub member to the end of the shaft so that torque may be frictionally transferred from the shaft 212 to the hub member 224.

As shown in FIGURES 7 and 8, the inner face of the hub member 224 has secured to the greater portion of its area a laminated coupling structure 232. As more clearly shown in FIGURE 8, the flexible laminated coupling structure is shown as consisting of three flexible steel disc members that are bonded to one another and are also bonded to the inner face of the hub member 224. The flexible coupling shown in FIGURES 7 and 8 utilize three flexible steel discs, but it is to be understood that this is purely for purposes of illustration, as the coupling could be formed of more than three steel disc members. The outermost portions of the flexible coupling 232 are secured to a centering ring 242 by adhesively bonding the inner face of the innermost disc to the outer face of the centering ring 242. A second flexible laminated coupling structure 246 embodying a plurality of steel discs is also secured to the centering ring 242 and to a hub or sleeve member 254 in the same manner as the flexible coupling 232 is secured to the centering ring 242 and the hub member 224.

It is to be noted that the flexible couplings 232 and 246 are both bonded, by any suitable adhesive material, to the inner faces of the hub members 224 and 254 and said bond extends over substantially the entire inner face area of the hub members terminating near the bore of each of said hub members. Thus by extending the flexible couplings over the greater portion of the inner faces of the hub members and by bonding said couplings to the inner faces of the hub members in the manner as disclosed in FIGURES 7 and 8, a stronger bonding joint is obtained which permits the entire load that is normally carried by the coupling unit to be in single shear instead of requiring a double shear loading as is common in prior art devices of this type. The flexible couplings 232 and 246, FIGURE 8, have the middle disc bonded to the outermost disc at approximately ⅔ of its area where said discs are joined to the inner hubs and the inner discs are bonded to the middle disc at approximately ⅓ of their area so that the middle disc takes only about ⅔ full shear load of where it is joined to the outer disc, and the inner disc takes only about ⅓ full shear load in the area of the inner faces of the hub members 224 and 254. On the other hand, it is to be noted that with respect to the centering ring 242, the reverse situation occurs in that the middle disc of the flexible coupling 232 and 246 is bonded to the innermost disc over approximately ⅔ of its area, whereas the outermost disc is bonded to the middle disc over approximately ⅓ of its area where said discs are joined to the center ring. Thus, as regards the centering ring 242, the middle disc takes approximately ⅔ full shear load of the inner disc, while the outer disc takes approximately ⅓ full shear load with respect to the inner disc. Thus, where the joints of the flexible coupling discs do not take full shear load, they can be smaller in the manner as indicated in FIGURE 8, and this permits the free bending span of each of the discs of the flexible coupling unit to be longer than the radial span between the centering ring 242 and the hub members 224 and 254. This results in a greater axial deflection being made possible for a given outer centering ring diameter.

The hub or sleeve member 254 terminates in an annular flange 260 that is formed with a plurality of circumferentially spaced apertures for the reception of headed bolts 262. The sleeve or hub member 254 is connected to the output or quill shaft 214 by means of the bolts 262 which extend through suitable apertures formed in a cone shaped flange or nut member 264 and terminate in threaded bores provided in a second cone shaped flange or nut member 266. The flange or nut members 264 and 266 are threaded upon the end of the output or quill shaft 214 and, as the bolts 262 are threaded into the bores in the flange or nut member 266, the clamping force of said bolts forces the flanges or nut members 264 and 266 towards one another, thereby producing a high axial load on the threaded end portion of the quill or output shaft 214. Thus torque can be readily transmitted from the nut or flange members 264 and 266 to the shaft 214 by the friction created or generated in the threaded joint between the shaft and said flange or nut members. The cone shape of the nut members 264 and 266 results in the inner bores of said members being moved inwardly upon the threaded area of the shaft 214 by the contingent tightening of the bolts 262 and this movement produces a high radial compressive load on the threaded joint between the nut members and the shaft 214 which increases the capacity for torque to be transmitted through the nut members to the shaft 214. As clearly shown in FIGURE 7, the threaded connection between the end of the shaft 214 and the nut members 264 and 266 can employ threads wherein their V shaped grooves are inclined toward the left, as viewing FIGURE 7, and this arrangement increases the friction torque capability of nut member 264 while slightly decreasing the friction torque capability of nut member 266. This arrangement is regarded as being desirable inasmuch as nut member or flange 264 has a shorter and stiffer connection to the hub or sleeve member 254 than does the flange or nut member 266, so that the flange or nut member 264 will naturally tend to transmit more of the torque to the shaft 214 than would the flange or nut member 266.

The coupling unit as shown in FIGURE 7 may be readily removed from the shafts 212 and 214 by initially removing the bolts 262 and threading the flange or nut members 264 and 266 towards the right on shaft 214, as viewed in FIGURE 7, and then removing the bolts 228 from the nut 218, after which the coupling unit may be withdrawn from the end of shaft 212 by moving same to the right, inasmuch as there is sufficient clearance between the flange 260 of the hub member 254 and the end of the shaft 214.

Another embodiment is shown in FIGURE 9 for connecting the hub or sleeve member 254 to the end of the output or quill shaft 214, in that the bolts 262 extend through suitable apertures provided in a flange or nut member 272 which terminates in an annular flange or sleeve portion 274 that is internally threaded for engaging the threaded portion 276 of the shaft 214. The bolts 262 are threaded into suitable bores provided in a second flange or nut member 278 which is supported on the sleeve portion 274 of the nut member 272. Thus in the disclosure in FIGURE 9, the nut members clamp against one another and, being of a cone shape, both of them deflect radially inwardly and the sum of the radial forces is applied to the threads provided in the bore of the sleeve portion 274 of the nut member 272. This arrangement results in the nut member 272 and the sleeve portion 274 taking all of the torque so that the force on the threaded portion of the shaft 214 is radially inward and this permits the use of symmetrical thread angles.

What is claimed is:

1. A quick disconnect flexible coupling for connecting two substantially aligned shafts comprising:
   a member having a cone shaped configuration with a threaded bore mounted on a first of said shafts adjacent an end thereof;
   a cone shaped hub member having a bore and a counterbore for receiving the end of said first shaft;
   means carried by the peripheral portion of said cone shaped hub member and engaging the peripheral portion of said cone shaped member for initially centering said hub upon the end of said first shaft and then flexing and moving said hub member towards said first shaft end until the counterbore thereof frictionally engages said end of said first shaft and produces a compressive clamping force thereon contemporaneous with the flexing and moving of said cone shaped member towards said shaft to place one portion of the threaded bore of said cone shaped member under compression and another portion of the threaded bore under tension with respect to said first shaft;
   a second hub member connected to an end of the second of said shafts in spaced apart opposing relationship to said cone shaped hub member, and a coupling unit interposed between said cone shaped hub member and said second hub member, said coupling unit including a plurality of flexible disc members bonded to one another and to said hub members for transmitting torque therebetween.

2. A quick disconnect flexible coupling as set forth in claim 1 wherein said first mentioned member is formed with extension lips at the threaded bore thereof with the thread portion of one of said lips being placed in compression and the threaded portion of the other of said lips being placed in tension when said cone shaped hub member is frictionally secured to the end of said shaft.

3. A quick disconnect flexible coupling as set forth in claim 1 wherein said coupling unit constitutes a laminated structure of a plurality of flexible discs arranged in spaced relation to one another and bonded together by an adhesive film extending over substantially their entire surface, said discs deflecting axially when said shafts and hub members are axially deflected with said bonding film having a modulus of elasticity smaller than that of said flexible discs whereby a relatively high shear deflection is obtained in said bonding film and said discs tend to deflect as individual discs while transmitting torque from one hub member to the other.

4. A coupling as set forth in claim 1 wherein said first of said shafts is formed with a threaded portion adjacent an end thereof for receiving the threaded bore of said cone shaped member and said coupling unit includes a ring member to which the flexible discs are adhesively bonded.

5. A quick disconnect flexible coupling for connecting two substantially aligned shafts comprising:
   a cone shaped member having a threaded bore mounted on a first of said shafts adjacent an end thereof;
   a cone shaped hub member having a bore and a counterbore for receiving the end of said first shaft;
   means carried by the peripheral portion of said cone shaped hub member and engaging the peripheral portion of said cone shaped member for initially centering said hub upon the end of said first shaft and then flexing and moving said hub member towards said first shaft end until the counterbore thereof frictionally engages said end of said first shaft and produces a compressive clamping force thereon contemporaneous with the flexing and moving of said cone shaped member towards said shaft to place one portion of the threaded bore of said cone shaped member under compression and another portion of the threaded bore under tension with respect to said first shaft.
   a second hub member connected to an end of the second of said shafts in spaced apart opposing relationship to said cone shaped hub member; and
   a coupling unit interposed between said hub members, said coupling unit including a pair of laminated structures arranged in spaced parallel relation to one another with a portion of said laminated structures being secured to the inner adjacent surfaces of said hub members and means connecting another portion of said laminated structures together for transmitting torque from one shaft to the other.

6. A coupling as set forth in claim 5 wherein said laminated structures each include a plurality of flexible discs arranged in spaced parallel relation to one another and bonded to one another over varying portions of the areas at their inner and outer portions.

7. A quick disconnect flexible coupling as set forth in claim 5 wherein said last mentioned means includes a ring member interposed between and secured to said laminated structures.

8. A coupling as set forth in claim 7 wherein each of said laminated structures includes at least three flexible discs bonded together by an adhesive film with the outermost disc of each laminated structure being bonded to the inner surface of each hub member and the innermost disc of each laminated structure being bonded to said ring member.

9. A coupling as set forth in claim 8 wherein the middle disc is bonded at its inner portion to approximately two-thirds of the area of the outer disc and to approximately one-third of the area of the inner disc and at its outer portion to approximately one-third of the area of the outer disc and approximately two-thirds of the area of the inner disc so that said middle disc will take only two-thirds of the full shear load being transmitted from one hub member to the other hub member at the joint bonding the middle disc to the outer disc and at the joint bonding the middle disc to the inner disc.

10. A coupling as set forth in claim 5 wherein said second of said shafts is formed with a threaded end portion with a pair of cone shaped flange members threaded thereon, means connecting said second hub to said flange members contemporaneous with forcing said flange members towards one another to produce a high axial load on said threaded shaft and permit the transmission of torque from said hub member to said shaft.

11. A coupling as set forth in claim 10 wherein said cone shaped flange members are formed with threaded bores with the threads being formed with V-shaped grooves that are inclined towards said second hub member to increase the capabilities of one of said flange members while decreasing the capabilities of the other flange member in transmitting torque to said second shaft when said connection means secures said hub member to said flange members.

12. A coupling as set forth in claim 5 wherein said second of said shafts is formed with a threaded end portion with a pair of cone shaped flange members positioned thereon, one of said flange members having an integrally formed threaded sleeve portion for engaging the threaded end of said shaft and for supporting the other of said flange members and means carried by said second hub member and engaging said other of said flange members for connecting said flange members to said hub contemporaneous with deflecting said cone shaped flange members radially inwardly for transmitting torque to said second shaft through said one of said flange members and said threaded sleeve.

References Cited

UNITED STATES PATENTS

| | | | |
|---|---|---|---|
| 919,112 | 4/1909 | Zinke | 287—130 |
| 2,846,857 | 8/1958 | Hagenlocher | 64—13 |
| 3,124,942 | 3/1964 | Rothfuss | 64—13 |
| 3,286,488 | 11/1966 | Anderson. | |

JAMES A. WONG, Primary Examiner

U.S. Cl. X.R.

64—27; 287—129